United States Patent
Dellach

(10) Patent No.: US 10,625,382 B2
(45) Date of Patent: Apr. 21, 2020

(54) TOGGLE LEVER CLAMP

(71) Applicant: Delaware Capital Formation, Inc., Wilmington, DE (US)

(72) Inventor: Kenneth Paul Dellach, Shelby Township, MI (US)

(73) Assignee: Delaware Capital Formation, Inc., Wilmington, DE (US)

(*) Notice: Subject to any disclaimer, the term of this patent is extended or adjusted under 35 U.S.C. 154(b) by 220 days.

(21) Appl. No.: 13/800,337

(22) Filed: Mar. 13, 2013

(65) Prior Publication Data

US 2014/0035212 A1 Feb. 6, 2014

Related U.S. Application Data

(60) Provisional application No. 61/678,215, filed on Aug. 1, 2012.

(51) Int. Cl.
| | | |
|---|---|---|
| *B23Q 3/08* | (2006.01) | |
| *B25B 5/12* | (2006.01) | |
| *B25B 5/16* | (2006.01) | |

(52) U.S. Cl.
CPC ............... *B23Q 3/08* (2013.01); *B25B 5/122* (2013.01); *B25B 5/16* (2013.01)

(58) Field of Classification Search
CPC .................................... B25G 3/38; B25G 1/66
See application file for complete search history.

(56) References Cited

U.S. PATENT DOCUMENTS

| | | | | |
|---|---|---|---|---|
| 1,800,349 | A | * 4/1931 | Harry Hurason | ........ B25G 3/38 403/57 |
| 2,555,226 | A | * 5/1951 | Draughn | .................. B25G 3/38 15/144.1 |
| 2,567,436 | A | 9/1951 | Lampe | |
| 3,381,954 | A | 5/1968 | Blatt | |
| 3,697,060 | A | 10/1972 | Kulson | |
| 3,711,699 | A | * 1/1973 | Bacevius | ...................... 362/189 |

(Continued)

FOREIGN PATENT DOCUMENTS

| | | |
|---|---|---|
| CN | 101489716 | 7/2009 |
| DE | 200 04 977 | 7/2000 |

(Continued)

OTHER PUBLICATIONS

Office Action dated Feb. 3, 2016 in corresponding Chinese Application No. 201310331503.2 with English translation.

*Primary Examiner* — Brian D Keller
(74) *Attorney, Agent, or Firm* — Harness, Dickey & Pierce, P.L.C.

(57) ABSTRACT

The toggle lever clamp has a clamp housing coupled with a cylinder assembly. A piston assembly is movable within the cylinder assembly. A rod is coupled with the piston assembly. The rod extends into a cavity within the clamp housing. A toggle lever assembly is coupled at one end of the rod inside of the clamp housing. A sensor assembly is coupled with the clamp housing. The sensor assembly includes a pair of sensors or switches spaced from each other and positioned on a mounting plate. The mounting plate is slidably secured within the clamp housing. A sensor pickup is movably positioned on the rod so that the sensor pickup is multi-positionable on the rod to adjust the stroke of the toggle lever assembly.

10 Claims, 10 Drawing Sheets

(56) References Cited

U.S. PATENT DOCUMENTS

| | | | |
|---|---|---|---|
| 5,810,408 A * | 9/1998 | Armstrong | A01B 1/00 |
| | | | 16/422 |
| 5,823,519 A * | 10/1998 | Tunkers | B25B 5/16 |
| | | | 269/201 |
| 5,845,897 A | 12/1998 | Tunkers | |
| 5,996,984 A * | 12/1999 | Takahashi | 269/32 |
| 6,317,930 B1 * | 11/2001 | Hung | B25F 5/026 |
| | | | 16/430 |
| 6,354,580 B1 | 3/2002 | Nagai et al. | |
| 6,364,301 B1 | 4/2002 | Takahashi | |
| 6,565,074 B1 | 5/2003 | Wheeler | |
| 6,585,246 B2 | 7/2003 | McCormick et al. | |
| 6,612,557 B2 * | 9/2003 | Sawdon et al. | 269/32 |
| 6,629,689 B2 * | 10/2003 | Schauss | B25B 5/16 |
| | | | 269/228 |
| 6,644,638 B1 | 11/2003 | McCormick | |
| 6,685,177 B2 | 2/2004 | Dugas et al. | |
| 6,783,053 B2 | 8/2004 | Boettinger et al. | |
| 6,845,975 B2 | 1/2005 | Tunkers | |
| 6,869,068 B2 | 3/2005 | Zhao et al. | |
| 6,877,730 B2 | 4/2005 | Sawdon et al. | |
| 6,908,077 B2 | 6/2005 | Sawdon | |
| 6,948,708 B2 | 9/2005 | Moilanen et al. | |
| 6,997,447 B2 | 2/2006 | Fukui | |
| 7,121,539 B2 | 10/2006 | McCormick et al. | |
| 7,314,214 B2 | 1/2008 | Colby et al. | |
| 7,370,856 B2 | 5/2008 | Sawdon et al. | |
| 7,464,440 B2 * | 12/2008 | Decker | A47L 9/0036 |
| | | | 15/144.1 |
| 7,490,532 B2 | 2/2009 | Mulder | |
| 7,686,286 B2 | 3/2010 | Colby | |
| 8,136,803 B2 | 3/2012 | McIntosh et al. | |
| 8,162,300 B2 | 4/2012 | Kaiser et al. | |
| 8,215,622 B2 | 7/2012 | Fukui et al. | |
| 8,366,085 B2 | 2/2013 | Alexander et al. | |
| 8,382,083 B2 | 2/2013 | Martin | |
| 2004/0046299 A1 * | 3/2004 | Migliori | B25B 5/122 |
| | | | 269/32 |
| 2005/0225018 A1 * | 10/2005 | Tunkers | B25B 5/12 |
| | | | 269/243 |
| 2006/0197270 A1 | 9/2006 | Migliori | |
| 2009/0283948 A1 * | 11/2009 | Fukui et al. | 269/32 |
| 2011/0162522 A1 | 7/2011 | Tünkers | |
| 2011/0277280 A1 | 11/2011 | Blaauw et al. | |
| 2012/0056384 A1 | 3/2012 | Fleischer | |
| 2012/0193855 A1 | 8/2012 | Takahashi | |
| 2012/0272781 A1 | 11/2012 | Kaiser | |
| 2012/0272782 A1 | 11/2012 | Kaiser | |
| 2013/0276844 A1 * | 10/2013 | Moulton | A61H 3/02 |
| | | | 135/67 |

FOREIGN PATENT DOCUMENTS

| | | |
|---|---|---|
| DE | 10 2009 054153 | 5/2011 |
| EP | 1 524 081 | 4/2005 |

* cited by examiner

TOGGLE LEVER CLAMP

CROSS-REFERENCE TO RELATED APPLICATION

This application claims the benefit of U.S. Provisional Application No. 61/678,215, filed on Aug. 1, 2012. The entire disclosure of the above application is incorporated herein by reference.

FIELD

The present disclosure relates to a toggle lever clamp and, a toggle lever clamp that includes a sensor assembly fastenerlessly held in place.

BACKGROUND

Various types of toggle lever clamps exist in the art. These toggle lever clamps generally include a sensor assembly that determines the position of the cylinder rod within the clamp housing to determine the position of the lever arm. Ordinarily, the sensor assemblies are secured in a slot in the housing via various types of fasteners such as screws, bolts, or the like. The utilization of fasteners such as screws or bolts enables the sensor assembly to be readily removed from the clamp housing. This enables replacement of the sensor assembly as well as the substitution of the sensor assembly for a different stroke of the lever arm. Additionally, these clamps include manual handles fixed in position with respect to the housing. Further, they include one piece drive shafts that endure high stress forces and are expensive to manufacture.

While the toggle lever clamps perform satisfactorily for their intended purpose, designers strive to improve the art. A disadvantage of the prior art devices is that the castings include intricate designs to retain the sensor assemblies within the housing. Additionally, the removal of the sensor assembly from the housing provides an opportunity for debris to enter into the housing. Additionally, the sensor assembly seals a large slot in the clamp housing subjecting the housing to leakage. Further, manual handles protrude outwardly from the housing reducing the number of mounting positions. Also, there is only a coarse adjustment of the handle position, if any.

The present disclosure provides the art with a toggle lever clamp that includes a sensor assembly that is fastenerlessly held in place by the housing and cylinder assembly. The present disclosure provides a sensor pickup that is movably positioned along the cylinder rod to adjust the stroke of the lever arm. The present disclosure reduces the housing opening size. The device has a simple design that enables a reduction in the complexity of the housing to retain the sensor assembly within the housing. The device provides a manual handle that enables fine adjustment, is movable from side to side on the housing and does not interference with the mounting position. The device provides a multi-piece shaft sinter bonded together to reduce cost.

SUMMARY

According to the present disclosure, the toggle lever clamp comprises a clamp housing coupled within a cylindrical assembly. A piston assembly is movable in the cylinder assembly. A rod is coupled with the piston assembly and extends into the clamp housing. A toggle lever assembly is coupled with an end of the rod in the clamp housing. A sensor assembly is coupled with the housing. The sensor assembly includes a pair of sensors spaced from one another and positioned on a printed circuit board. The printed circuit board is slidably secured with the housing. A sensor pickup is movably positioned on the rod so that the sensor pickup is capable of multiple positions on the rod to adjust the stroke of the toggle lever assembly. The mounting plate is entirely covered by the housing. The sensor assembly is fixed in position by the connection of the clamp housing with the cylinder assembly. The sensor assembly is fastenerlessly held in position. The sensor pickup slides on the rod and includes a mechanism to lock the sensor pickup on the rod at a desired position.

According to a second embodiment, a toggle lever clamp comprises a clamp housing coupled with a cylinder assembly. A piston assembly is movably positioned in the cylinder assembly. A rod is coupled with the piston assembly. The rod extends into the clamp housing. A toggle lever assembly is coupled with an end of the rod inside the clamp housing. A sensor assembly is coupled with the housing. The sensor assembly includes a pair of sensors spaced from one another and positioned on a printed circuit board. The printed circuit board is slidably secured within the housing. The sensor assembly is fastenerlessly held in place by the housing and the cylinder assembly. The printed circuit board abuts against the cylinder assembly. Removal of the cylinder assembly from the housing enables the sensor assembly to be readily removed from the housing.

According to a third embodiment, a toggle lever clamp comprises a clamp housing coupled with a cylinder assembly. A piston assembly is movably positioned in the cylinder assembly. A rod is coupled with the piston assembly and extends into the clamp housing. A sensor assembly is coupled with the housing. A toggle lever assembly is coupled with an end of the rod inside the clamp housing. The toggle assembly includes a manual actuating mechanism with a driver coupled with a first link. A second link is coupled with the first link and a rod end member. The rod end member is coupled with a third link which, in turn, is coupled with a drive shaft. A handle assembly is coupled with the manual actuating mechanism. The handle assembly includes a shaft member coupled with the driver to move the toggle mechanism. An adjustment device is coupled with the shaft member to adjust an angle of a handle lever with respect to the shaft member to enable a desired position of the handle lever for a user.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
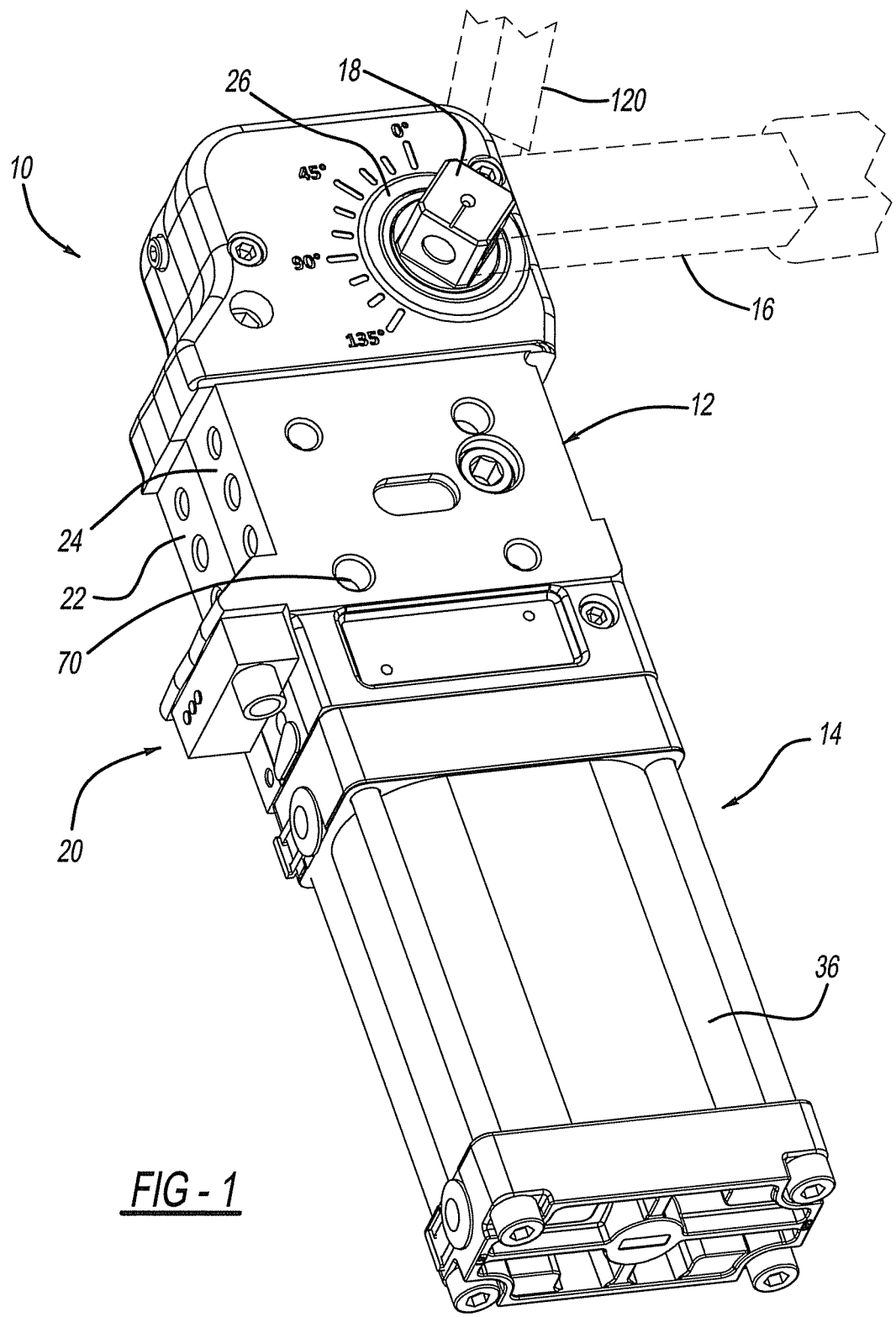
FIG. 1 is a perspective view of an embodiment of the toggle lever clamp.

Example embodiments will now be described more fully with reference to the accompanying drawings.

A toggle lever clamp is illustrated and designated with the reference numeral 10. The toggle lever clamp 10 includes a clamp housing 12 and a cylinder assembly 14. A lever arm 16 extends from a drive shaft member 18 projecting from the clamping housing 12. A sensor assembly 20 is associated with the clamp housing 12.

Figure 2:
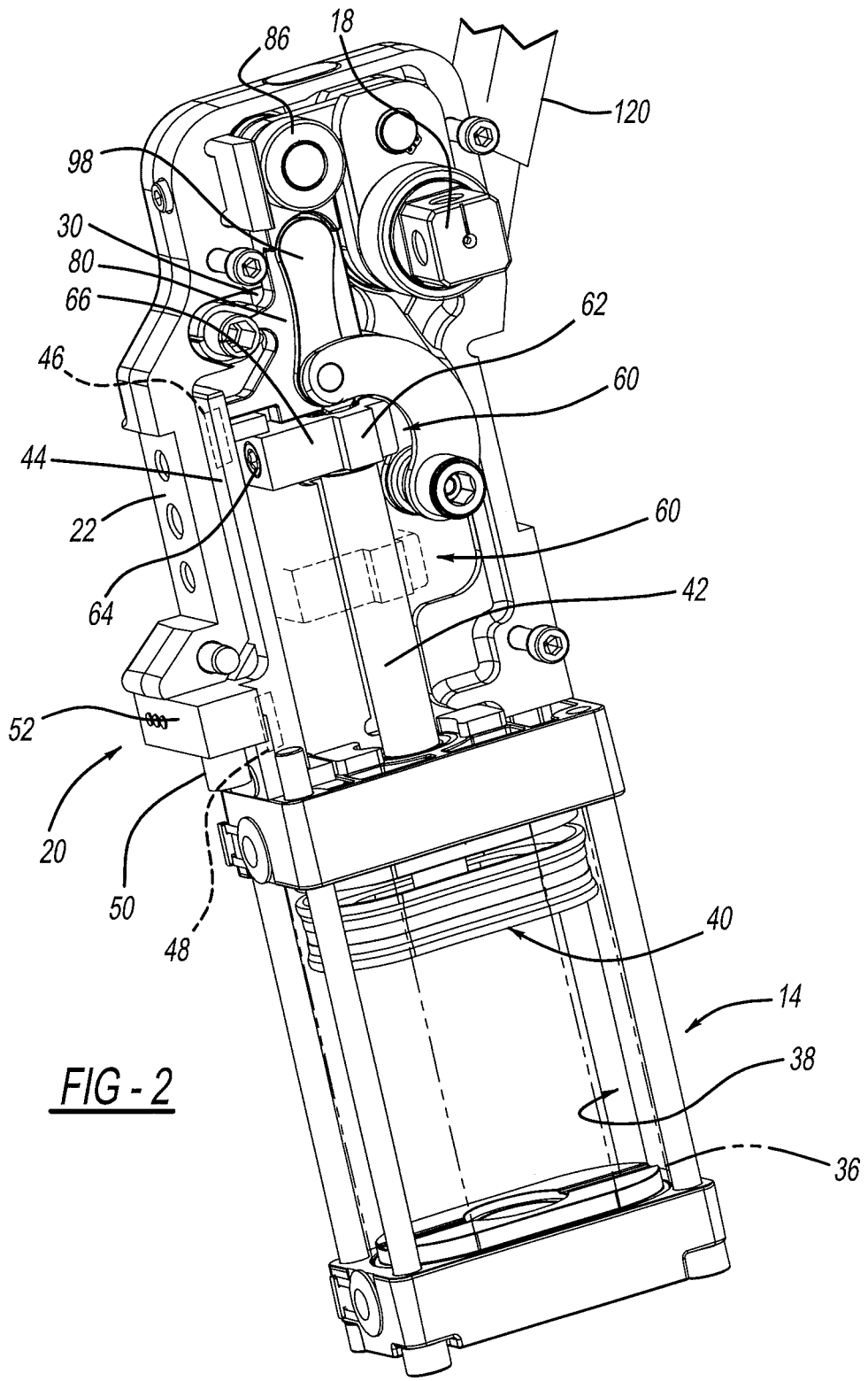
FIG. 2 is a perspective view with a housing half removed from the embodiment of FIG. 1.
Figure 3:
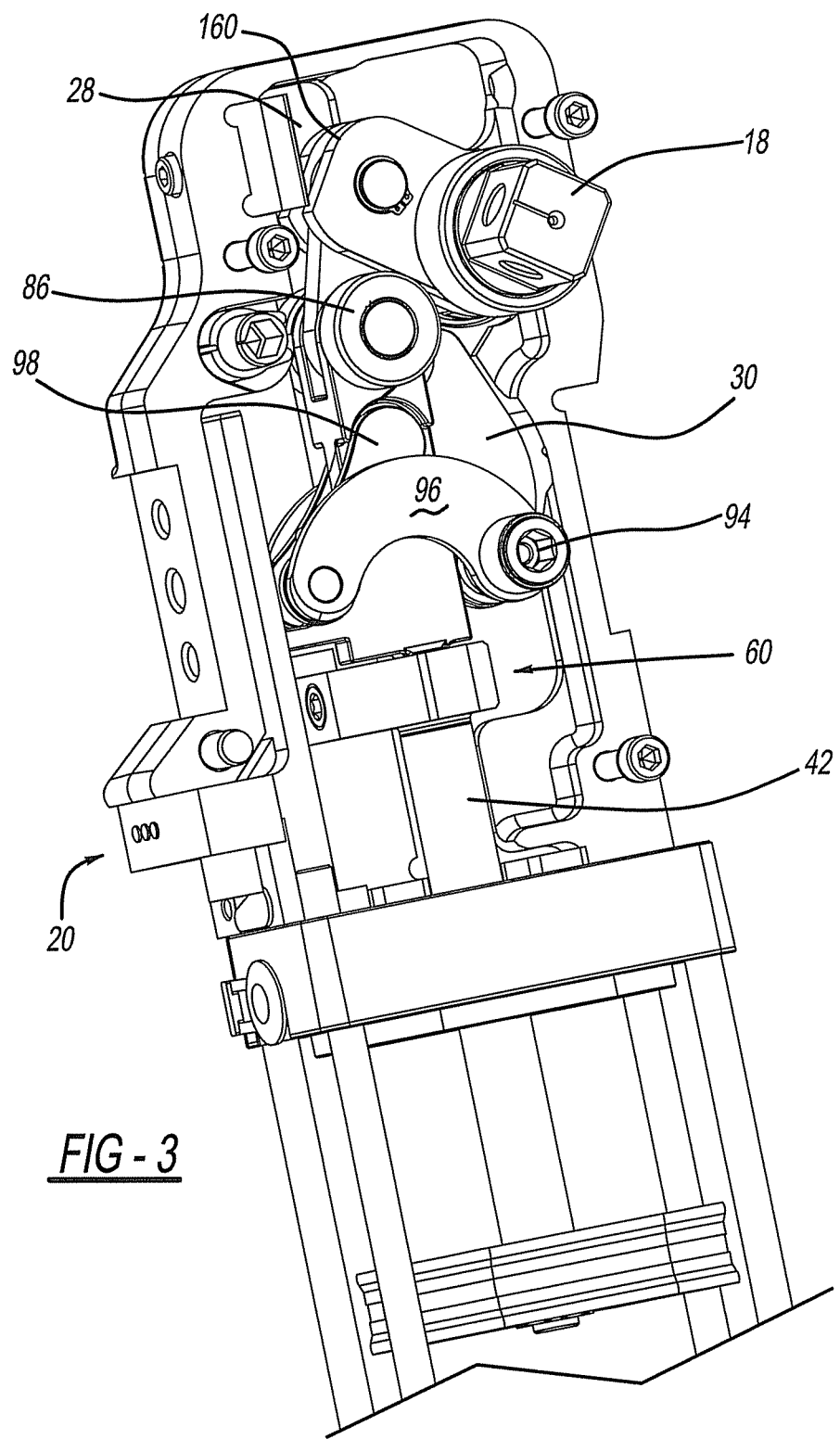
FIG. 3 is a perspective view of the embodiment according to FIG. 2.
Figure 4:
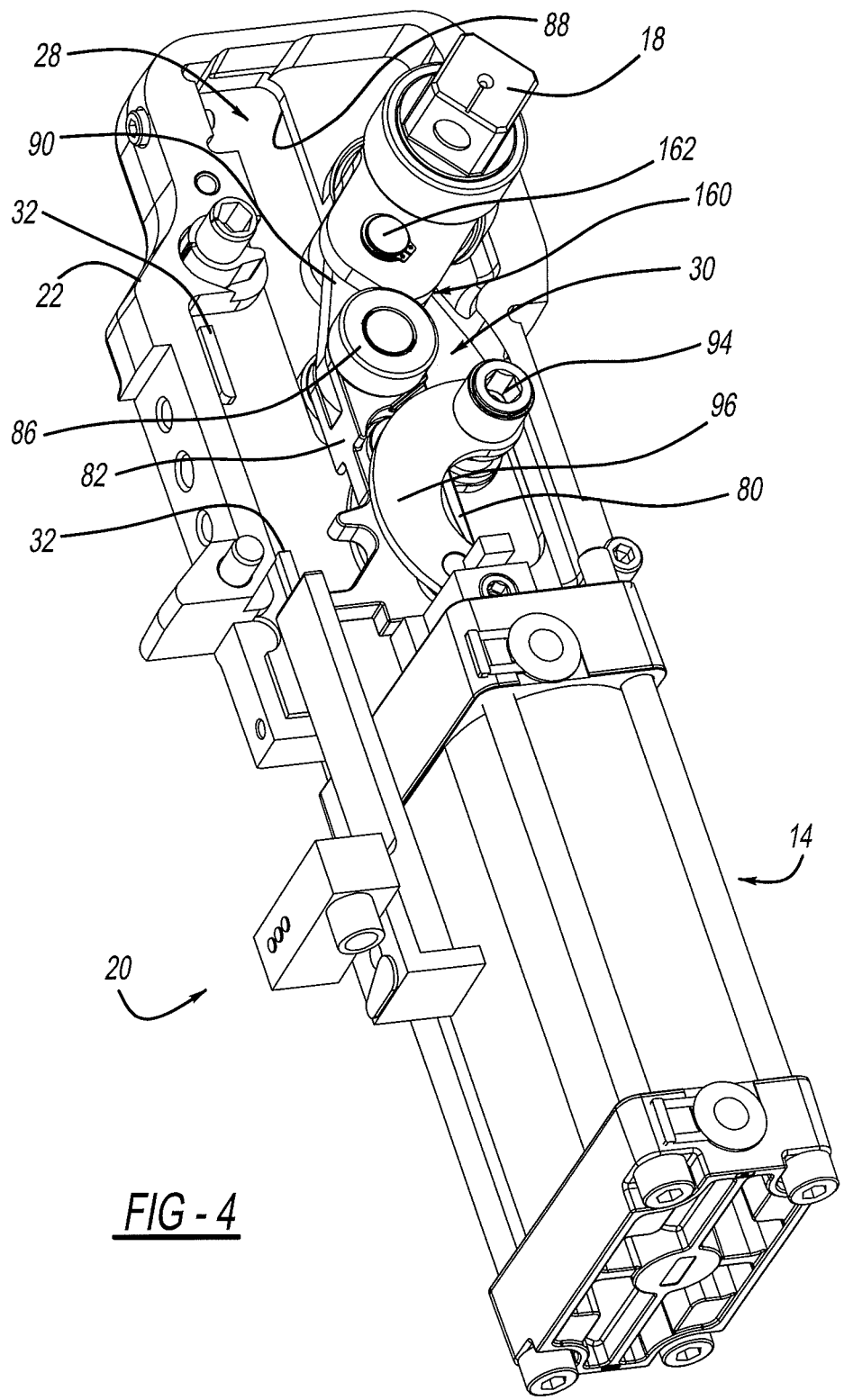
FIG. 4 is a view like FIG. 3 with the cylinder rotated.

The clamp housing 12 includes a pair of housing halves 22 and 24. As seen in FIGS. 2-4, the housing half 24 is removed. The housing halves 22 and 24 are of a clamshell design and are coupled with one another. The housing 24 includes an aperture 26 to enable the drive shaft member 18 to project outside of the clamp housing 12 and couple with the lever arm 16.

The housing halves 22 and 24 include a hollow cavity 28 between the halves. The hollow area or cavity 28 houses the toggle mechanism 30 that is coupled with the drive shaft mechanism 18. The housing halves 22 and 24 include shelves 32 that receive the sensor assembly 20.

The cylinder assembly 14 includes a cylinder housing 36 that includes a hollow bore 38 that houses a piston assembly 40. The piston assembly 40 moves up and down in the cylinder housing 36 to move a piston rod 42 in the clamp housing 12. The piston rod 42 is couple at one end with the toggle mechanism 30.

The sensor assembly 20 includes a mounting plate 44 with a pair of sensors or target switches 46 and 48. The sensor assembly 20 also includes a mechanism 50 to secure it with a wire harness that associates the sensor assembly 20 with a power source and a controller. The sensor assembly 20 also includes LEDs 52 that provides information of the sensor assembly 20. The mounting plate 44 usually includes a printed circuit board and is substantially rectangular and flat. The mounting plate 44 is slid into the shelves 32 to maintain the mounting plate 44 within the clamp housing 12. Additionally, the cylinder assembly cover 54 abuts the bottom of the mounting plate 44 to secure the sensor assembly 20 within the clamp housing 12. Thus, there are no fasteners used to directly retain the sensor assembly 20 in the clamp housing 12. The sensor assembly 20 is sandwiched by the clamp housing 12 and the cylinder assembly 14 to retain it in position. This enables ready removal of the sensor assembly 20 from the housing. Additionally, it eliminates a large slot to position the sensor assembly 20 within the clamp housing 12 which reduces the area to be sealed by the sensor assembly 20.

A sensor pickup 60 is secured to the rod 42. The sensor pickup 60 includes a collar assembly 62 and a pickup 64. The collar assembly 62 includes a fastener 66 that enables the collar portion 68 to be positioned in a multiplicity of positions along the rod 42. Thus, since the sensor pickup 60 can be multi-positioned along the rod 42, the stroke of the lever arm 16 can have multiple adjustments. The collar assembly 62 is adjusted via an aperture 70 in the housing half 24. A tool is placed through the aperture to loosen and tighten the fastener 66. A plug 72 is positioned in the aperture to keep debris from entering the cavity 28.

The toggle mechanism 30 includes a plurality of links positioned within the housing cavity 28. The links provides for the rotation of the drive shaft member 18. Additionally, the links provide for the adjustment of the drive shaft member 18 at a desired position. Also, the links enable the drive shaft member 18 to rotate between its opened (first) and clamped (second) position.

Figure 5:
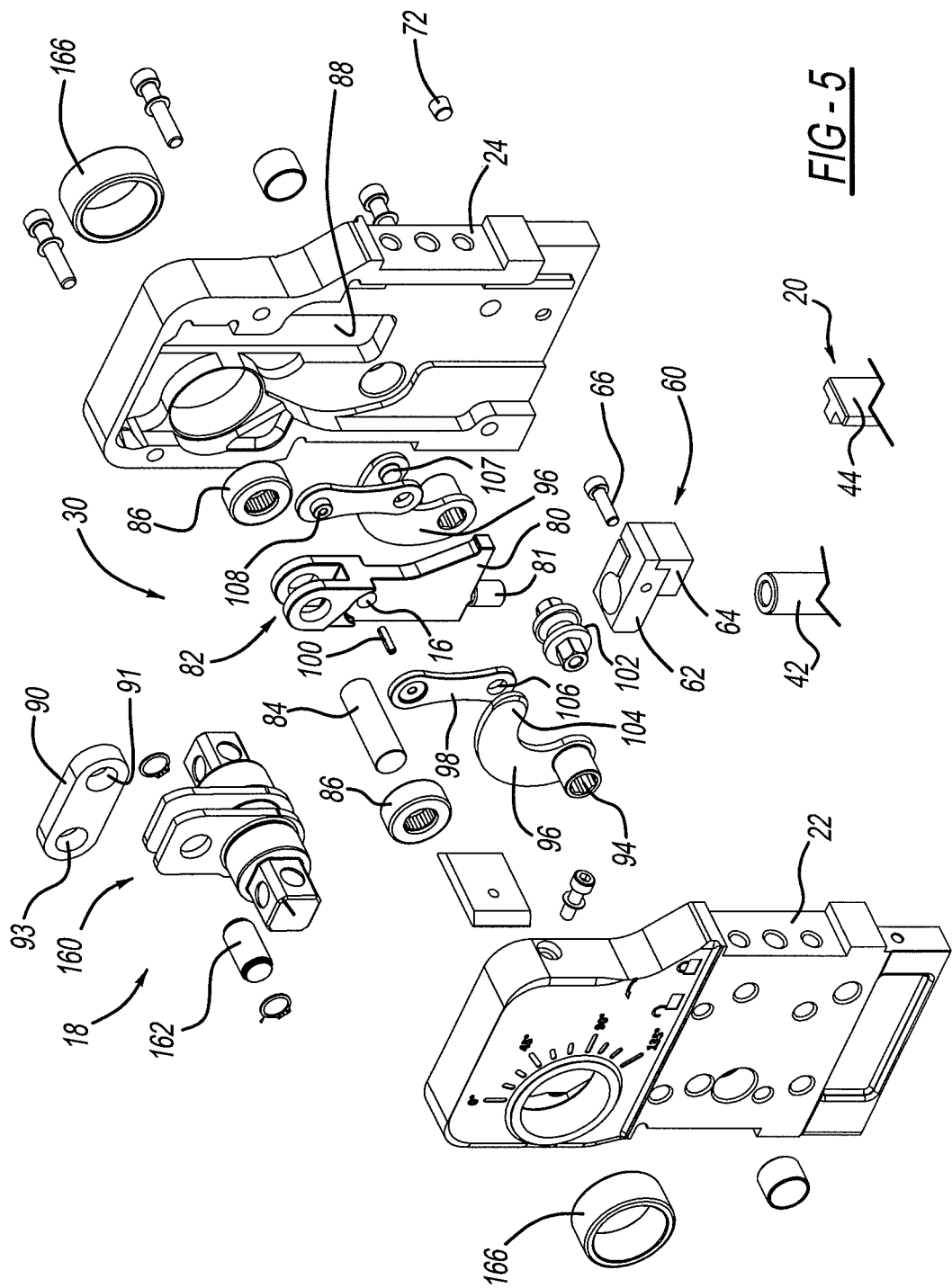
FIG. 5 is an exploded perspective view of the toggle assembly.
Figure 6:
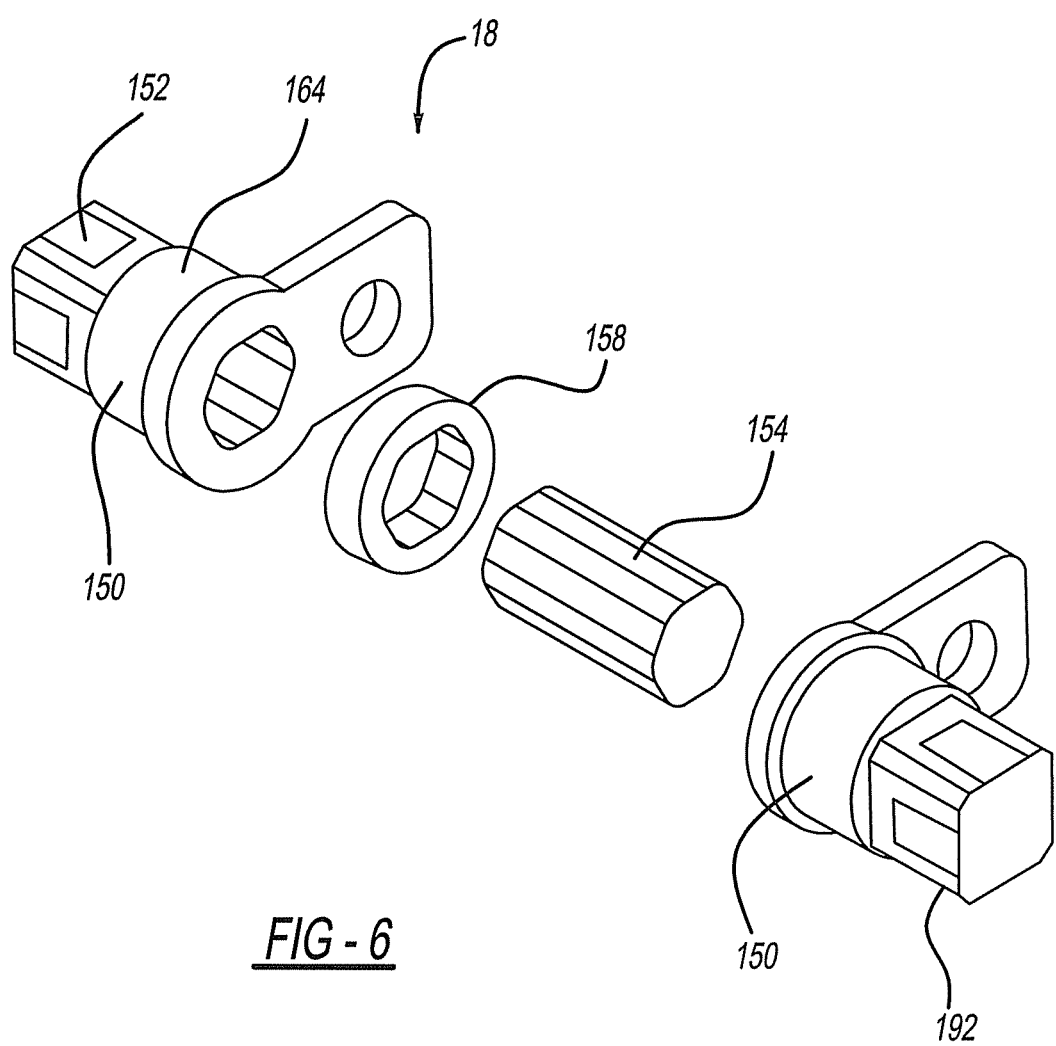
FIG. 6 is an exploded perspective view of the drive shaft.
Figure 7:
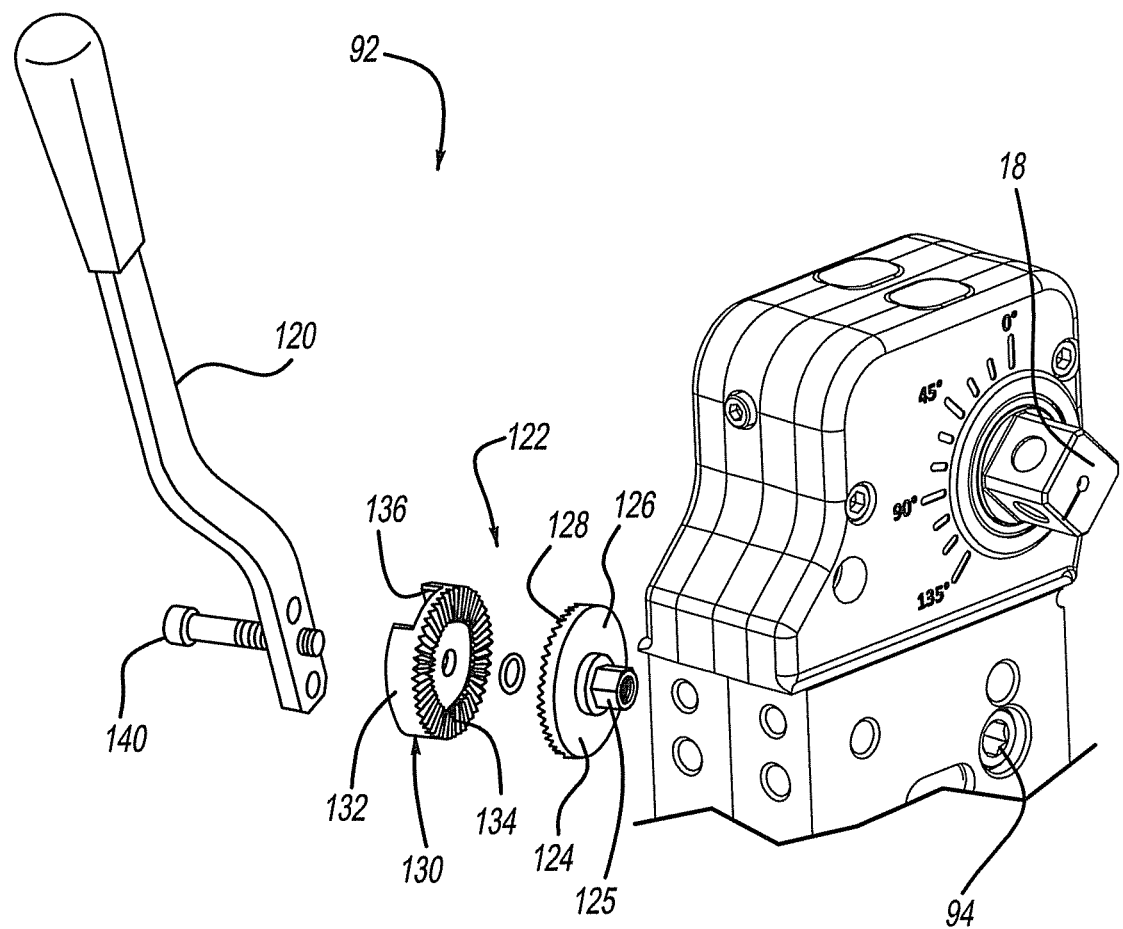
FIG. 7 is an exploded perspective view of the handle assembly.

Turning to FIG. 5, an exploded view of the toggle mechanism 30 is illustrated. The toggle mechanism 30 includes a rod end member 80 that includes a connection 81 to couple with the rod 42. The rod end member 80 also includes a clevis 82 with a pair of ears including apertures to receive a pin 84. The pin 84 includes a pair of bearings 86, one each on each side of the clevis 82. The bearings 86 ride in channels 88 in the housing halves 22, 24. This enables the rod end member 80 to move linearly in the cavity 28.

A link 90 includes an aperture 91 that receives the pin 84. The link 90 is coupled with the rod end member 80 in the clevis 82. The link 90, via aperture 93, is also coupled with the drive shaft 18. Thus, as the cylinder assembly 14 moves the rod 42 up and down, the linear movement of the rod end member 80 coupled with the drive shaft 18, via the link 90, rotates the drive shaft member 18 in the housing 12. This, in turn, moves the lever arm 16 between an open and closed position.

The toggle mechanism 30 is manually operated via the handle assembly 92. The handle assembly 92 is coupled with a receiving mechanism 94. The receiving member 94 is on each side of the housing 12. Thus, the handle assembly 92 can be utilized on either side of the housing 12. The receiving mechanism 94 is coupled with first link 96. The first link 96 is coupled with a driven link 98 which is, in turn, secured via a pin 100 to the rod end member 80. The manual adjusting toggle mechanism 30 includes a pair of first links 96 and driven links 98 positioned on each side of the rod end member 80, as seen in FIG. 5. The links 96 are identical and are connected, via a hub 102, that couples with the receiving mechanism 94. The first links 96 also includes an aperture 104 that receives an ear 106 from the driven link 98. Also, the driven link 98 includes an ear 108 that projects into an aperture 110 in the rod end member 80. Thus, the toggle mechanism 30 can be manually operated to move the lever arm 16 between its open and closed position.

By rotating handle assembly 92, the first links 96 rotate which, in turn, moves the driven links 98 along with the rod end member 80 in the cavity 28. The manual toggle mechanism 30 is capable of moving the lever arm 16 between an open and closed position via movement of the handle assembly 92.

The handle assembly 92 includes a handle lever 120 and an adjustment mechanism 122. The adjustment mechanism 122 includes a coupling mechanism 124 that includes a socket 125 that couples the handle assembly 92 with the receiving mechanism 94. The coupling mechanism 124 also includes a base 126 with a plurality of teeth 128. A second member 130 includes a base 132 with a plurality of mating teeth 134. The second member 130 includes a channel 136 to receive the handle lever 120. The teeth 128, 134 enable the handle lever 120 to be finely positioned to accommodate the user. The teeth enable the handle lever 120 to be adjusted at approximately 7.5° increments per each movement between the teeth. A bolt 140 retains the handle assembly 92 together.

The drive shaft 18 is formed from a plurality of hardened metal parts. The drive shaft 18 includes a pair of end member 150 that include a receiving member 152 to receive the lever arm 16. A keying shaft 154, with a plurality of faces, fits into mating apertures 156, including receiving faces, in the end member 150 to receive the keying shaft 154. Additionally, a spacer 158 is positioned between the end members 150. Once the drive shaft 18 is positioned together, it is sinter bonded together to fuse the powered metal parts together. This reduces the costs of manufacturing the drive shaft 18. Once together, the drive shaft 18 includes a clevis 160 that receives pin 162 that secures link 90 in the drive shaft clevis 160. The drive shaft end members 150 include a cylindrical portion 164 that fits within bearings 166 in the housing 12 to enable smooth rotational movement of the drive shaft 18 in the housing 12.

Figure 8:
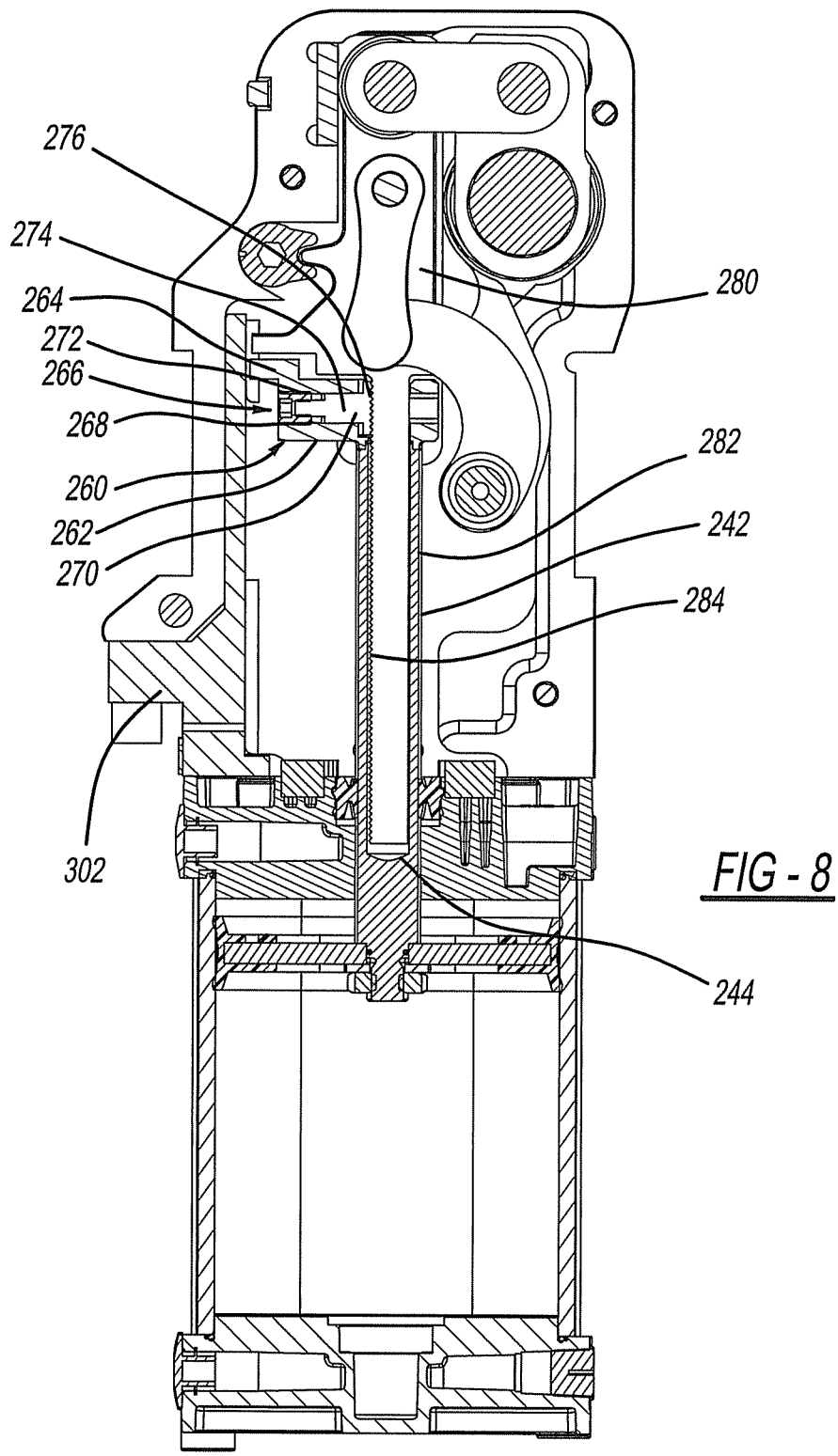
FIG. 8 is a cross-section view of a second embodiment of the toggle lever clamp.
Figure 9:
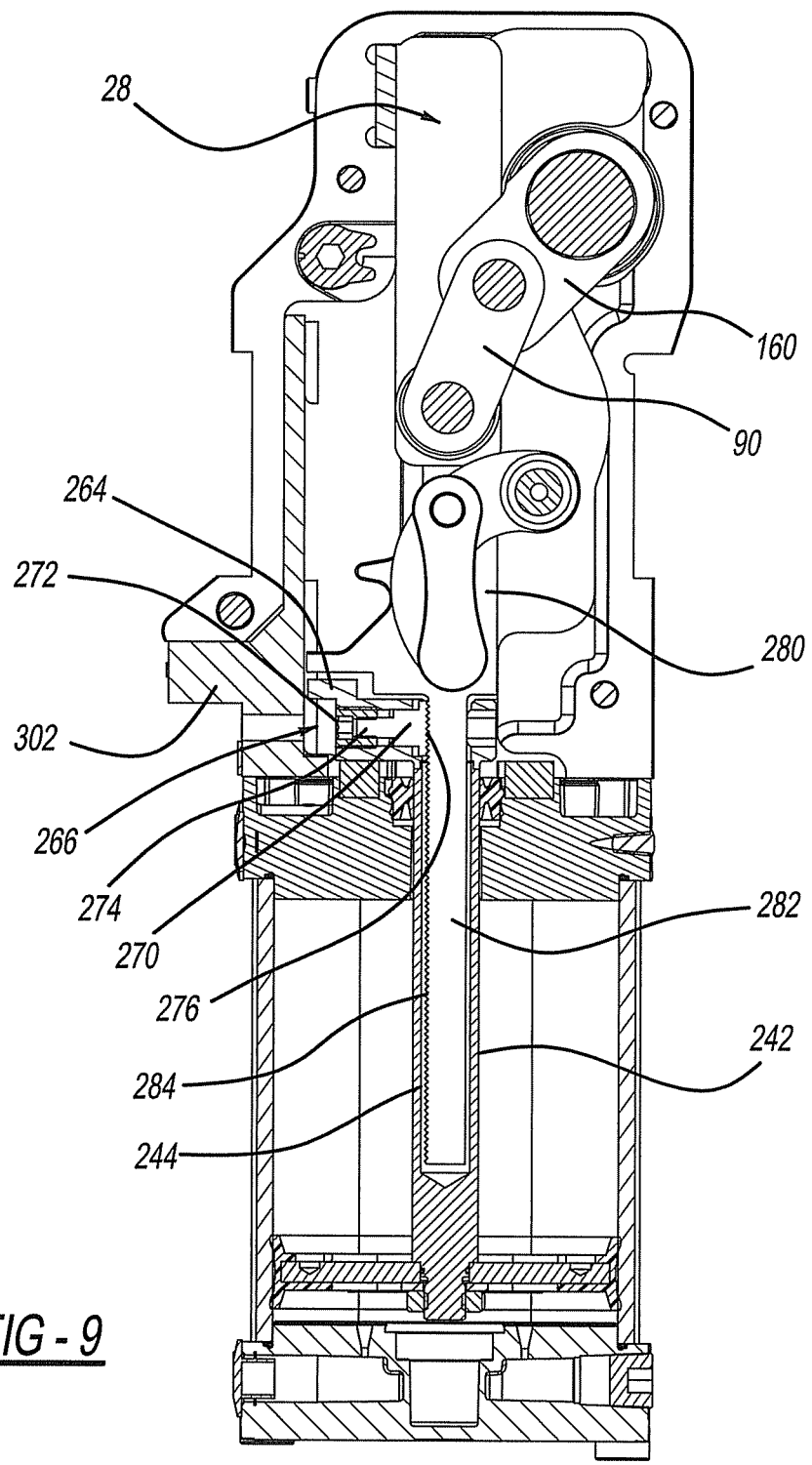
FIG. 9 is a cross-section view like FIG. 8.
Figure 10:
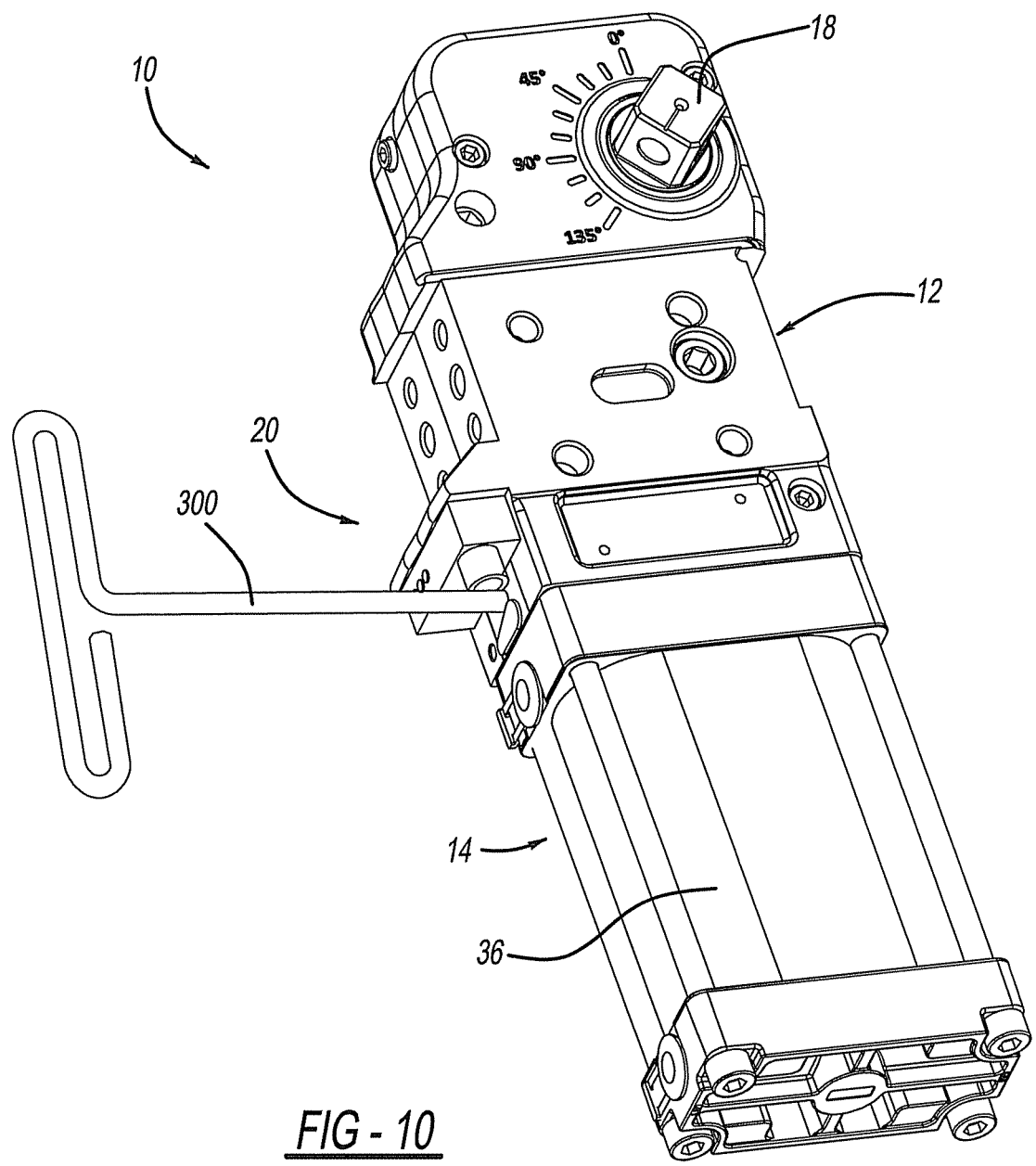
FIG. 10 is a perspective view of the second embodiment of the toggle lever clamp.

Turning to FIGS. 8-10, a second embodiment is illustrated to adjust the stroke of the toggle clamp. The elements which are the same as previously discussed include the same reference numerals.

Here, the piston rod 242 is hollow and includes a hollow bore 244. The link 280 includes an extending rod portion 282 that extends into the bore 244. The rod portion 282 includes a plurality of teeth 284 to enable adjustment of the link 280 with respect to the piston rod 242.

The sensor pickup 260 includes a collar portion 262 and a pickup 264. The collar 262 includes an engagement mechanism 262, 266 that engages with the teeth 284 of the rod 282 to adjust the link 280 with respect to the piston rod 242. The adjustment mechanism 266 includes a threaded collar 268 coupled with a ratchet pawl 270. The threaded collar 268 generally has a hexagonal bore 272 to receive a tool 300 to adjust the mechanism 266. The ratchet pawl 270 includes a spigot 274 which is secured in the bore 272. Also, the ratchet pawl 270 includes teeth 276 that mesh with teeth 284 of the rod 282.

To adjust the link 280 with respect to the rod 242, the tool 300 is inserted into a bore 302 when the pickup mechanism 260 is in a down position as illustrated in FIG. 9. The tool 300 is inserted into the hexagonal bore 272 to enable the collar 268 to be rotated in the collar portion 262. As this occurs, the ratchet pawl 270 and teeth 276 disengage from the teeth 284 of the rod 282. Thus, the link 280 can be manually manipulated by the handle mechanism 92 to adjust the link to its desired position. After that is done, the tool 300 is rotated in a reverse direction driving the ratchet pawl 270 back into engagement with the teeth 284 of the rod 282. Thus, a different as well as multiple positions may be obtained for adjustment of the toggle clamp.

The present disclosure has been described with reference to a preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A toggle lever clamp comprising:
   a clamp housing;
   a cylinder assembly coupled with the clamp housing;
   a piston assembly movable in the cylinder assembly;
   a rod coupled with the piston assembly, the rod extending into the clamp housing;
   a toggle lever assembly coupled with an end of the rod in the clamp housing;
   a sensor assembly including a pair of sensors and a mounting plate;
   the pair of sensors spaced from each other and positioned on the mounting plate, the mounting plate slidably received within a cavity defined by the clamp housing, a slot is defined in the cavity by a member shelf positioned in the cavity and an inner surface of an exterior wall, the mounting plate is configured to be guided into the cavity and is configured to be concealed by the exterior wall and held in position in the cavity by inserting the mounting plate into the slot between the exterior wall inner surface of the clamp housing and the member shelf positioned in the cavity; and
   a sensor pickup movably positioned on the rod so that the sensor pickup is positionable on the rod to adjust the stroke of the toggle lever assembly.

2. The toggle lever clamp as set forth in claim 1 wherein the mounting plate is covered by the clamp housing.

3. The toggle lever clamp as set forth in claim 1 wherein the sensor assembly is fixed in position by connection of the clamp housing with the cylinder assembly.

4. The toggle lever clamp as set forth in claim 1 wherein the sensor assembly is fastenerlessly held in position.

5. The toggle lever clamp as set forth in claim 1 wherein the sensor pickup is configured to slide on the rod and includes a mechanism to lock the sensor pickup on the rod at a desired position.

6. A toggle lever clamp comprising:
   a clamp housing;
   a cylinder assembly coupled with the clamp housing;
   a piston assembly movable in the cylinder assembly;
   a rod coupled with the piston assembly, the rod extending into the clamp housing;
   a toggle lever assembly coupled with an end of the rod in the clamp housing;
   a sensor assembly including a pair of sensors and a mounting plate;
   the pair of sensors spaced from each other and positioned on the mounting plate, the mounting plate is slidably received within a slot in the clamp housing to be concealed by the clamp housing and held within the clamp housing;
   a sensor pickup movably positioned on the rod so that the sensor pickup has multiple positions on the rod for adjusting the stroke of the toggle lever assembly; and
   the sensor assembly further held in place by clamping the sensor assembly directly between opposing ends of the clamp housing and the cylinder assembly when the mounting plate is disposed in the slot.

7. The toggle lever clamp as set forth in claim 6 wherein the mounting plate abuts the cylinder assembly.

8. The toggle lever clamp as set forth in claim 6 wherein the cylinder assembly is configured to be rotated relative to the clamp housing into an uncoupled position to enable the sensor assembly to be readily removed from the clamp housing.

9. The toggle lever clamp of claim 6, wherein an adjustment device includes meshing teeth for enabling adjustment.

10. The toggle lever clamp of claim 9, wherein the meshing teeth are spaced with respect to one another to enable a handle lever to be adjusted at 7.5° increments per a movement between the adjacent teeth.

* * * * *

UNITED STATES PATENT AND TRADEMARK OFFICE
CERTIFICATE OF CORRECTION

PATENT NO. : 10,625,382 B2
APPLICATION NO. : 13/800337
DATED : April 21, 2020
INVENTOR(S) : Kenneth Paul Dellach Page 1 of 1

It is certified that error appears in the above-identified patent and that said Letters Patent is hereby corrected as shown below:

In the Claims

<u>Column 6</u>
Line 8, Claim 1      before "shelf", delete "member"
Line 15, Claim 1    before "shelf", delete "member"

Signed and Sealed this
Sixth Day of October, 2020

Andrei Iancu
*Director of the United States Patent and Trademark Office*